United States Patent [19]
McCoy

[11] Patent Number: 6,079,834
[45] Date of Patent: Jun. 27, 2000

[54] HIGH SPEED OPTICAL IMAGE SELECTION SYSTEM

[76] Inventor: Bryan Lawrence McCoy, 3872 Las Flores Canyon, Malibu, Calif. 90265

[21] Appl. No.: 09/274,893

[22] Filed: Mar. 23, 1999

[51] Int. Cl.[7] .................................................. G03B 21/14
[52] U.S. Cl. .............................................................. 353/110
[58] Field of Search .................................. 353/30, 34, 39, 353/85, 108, 109, 110, 103, 25, 26 R, 27 R, 27 A; 348/901

[56] References Cited

U.S. PATENT DOCUMENTS

| | | | |
|---|---|---|---|
| 3,124,034 | 3/1964 | Edhouse | 353/110 |
| 3,287,830 | 11/1966 | Fleury et al. | |
| 4,486,870 | 12/1984 | Pettigrew et al. | 353/27 A |
| 4,679,922 | 7/1987 | Nelson | 353/110 |
| 5,188,363 | 2/1993 | Marnell, II et al. | 273/85 CP |

*Primary Examiner*—William Dowling
*Attorney, Agent, or Firm*—Oppenheimer Wolff & Donnelly LLP

[57] ABSTRACT

An exemplary high-speed moving optical image selection system includes (1) at least one image viewing area or zone, (2) at least one image projection path to direct images onto the image viewing area or zone, (3) an image storage member where a plurality of images are stored, (4) a motor coupled to the image storage member to rotate the image storage member at a high speed of one rotation in less than 1/50 of a second to move the images into the image projection path, (5) at least one light source that has an light emitting interval of generally less than 10 microseconds, (6) operator control buttons to control and select images, and (7) electronic circuitry to monitor positions of images and to actuate the light source when selected images are in the image projection path.

20 Claims, 10 Drawing Sheets

HIGH SPEED OPTICAL IMAGE SELECTION SYSTEM

FIELD OF THE INVENTION

This invention relates generally to image selection systems, and particularly to image selection systems that use a light projection system to project action images onto at least one image viewing area or zone.

BACKGROUND OF THE INVENTION

There are a number of prior art electronic devices that use controlled lighting to display images. U.S. Pat. No. 5,188,363, issued to Marnell, II et al. (hereinafter Marnell), discloses an electronic game apparatus for playing poker. The Marnell apparatus has a display assembly that includes a plurality of visually perceptible card representations, lights that are placed near the card representations, a controller that is connected to the light source, and an input device connected to the controller. The controller has a random sequence generator to momentarily actuate the lights in a random sequence to randomly display the card representations. When a user utilizes the input device to interrupt the random sequence and select a card representation, the controller responds by actuating lights near the selected card representation to illuminate it. The display assembly of the Marnell apparatus is stationary. Furthermore, the lights of the Marnell apparatus are used to illuminate, and not to project, the card representations.

U.S. Pat. No. 3,287,830, issued to Fleury et al. (hereinafter Fleury), discloses a portable visual and aural communication device. The Fleury communication device comprises a cabinet with a glass screen mounted on its top panel for viewing visual images, and a control mechanism for operation the device. The control mechanism is preferably a manual crank. A user turns the crank to select a word phrase that is stored on a pre-recorded film strip that is mounted on spools and contains many word phrases in many languages. The selected phrase is projected onto the screen by a projection system energized by turning on a switch. The projection system includes a light source to project the stationary film segment that contains the selected word phrase and a lens system to direct the projected film segment onto the glass screen for viewing. The control mechanism in the Fleury communication device moves the film at a generally slow speed. Furthermore, once the switch is turned on, the light source provides continuous lighting until the switch is turned off.

SUMMARY OF THE INVENTION

An exemplary high-speed optical image selection system for producing high resolution moving images includes (1) at least one image viewing area or zone, (2) at least one image projection path to direct images onto the image viewing area or zone, (3) an image storage member where a plurality of images are stored, (4) operator control buttons to control and select images, (5) a motor coupled to the image storage member to rotate the image storage member at a high speed to complete one rotation in generally less than $\frac{1}{50}$ of a second to move the images into the image projection path, (6) at least one light source that has a very brief light emitting interval of generally less than 10 microseconds, and (7) electronic circuitry to monitor positions of images and to actuate the light source when selected images are in the image projection path.

The light source can be fired to display or redisplay an image or successive images each time the selected image is placed in the image projection path. Since the motor rapidly moves an image into the image projection path in generally less than $\frac{1}{50}$ of a second, the image can be displayed or redisplayed at that same rapid rate. As a result, the moving images are flicker-free since the human eye can only detect and assimilate images that are displayed or redisplayed at approximately 50 times per second.

Furthermore, the rapid rate of display or redisplay also facilitates the multiplexing of images where two or more images are superimposed on the image viewing area or zone to make a scene. For example, a scene may have a background image and a foreground image. To project or display the scene, the system first fires the light source when the background image is properly placed into the image projection path to project or display the background image. Following the projection or display of the background image, the light source is fired when the foreground image is in the image projection path to project or display the foreground image. Due to the rapid rate of image projection or display, a typical user would see a generally flicker-free scene, with background and foreground images being superimposed on each other.

In accordance with another system aspect of the invention, the high-speed optical image selection system may also include a microprocessor to execute a software program (1) to receive and interpret operator input that a user enters through the operator control buttons to select images to be projected, (2) to monitor positions of images, and (3) to actuate the light source.

In accordance with a further aspect of the invention, the system may include an image position sensing circuit that scans the image storage member for a reference marker location and image position markers in determining the positions of images.

In accordance with another aspect of the invention, the images may be located on a film disk or drum which is rotated at high speed.

A further aspect of one embodiment of the invention involves the use of separate related images for the left and right eyes to provide depth or three-dimensional images.

One advantage of the present system is that the action images may be high resolution images having essentially photographic image quality.

The above described and many other features and attendant advantages of the present invention will become apparent as the invention becomes better understood by reference to the following detailed description when considered in conjunction with the accompanying drawings.

DETAILED DESCRIPTION OF PREFERRED EMBODIMENTS

The current invention relates generally to image selection systems, and particularly to image selection systems that use a light projection system to project action images onto at least one image viewing area or zone. The following detailed description is provided to enable any person skilled in the art to make and use the invention and to set forth the best modes contemplated by the inventor for carrying out the invention. This description is not to be taken in a limiting sense, but is made merely for the purpose of illustrating the general principles of the invention.

Figure 1:
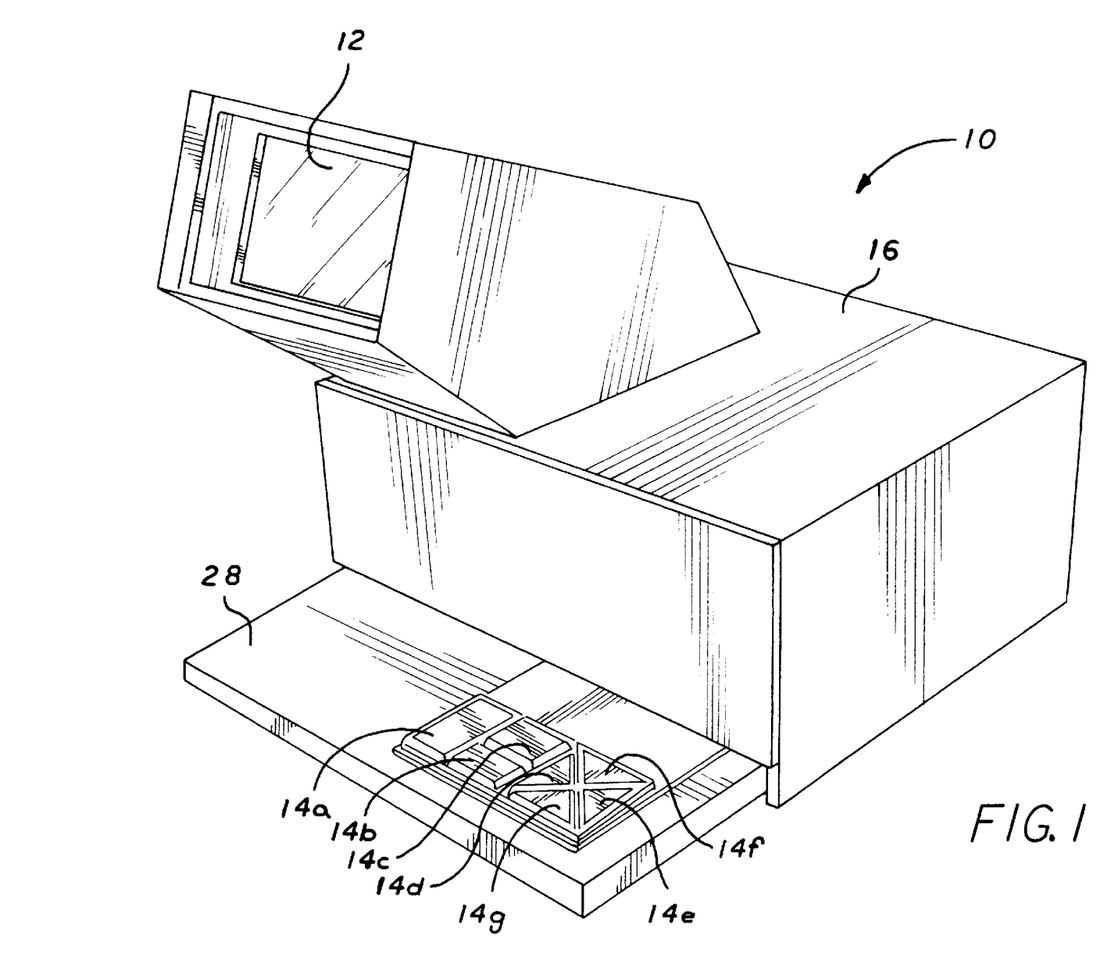
FIG. 1 is a perspective view of one exemplary high-speed optical image selection system.
Figure 2:
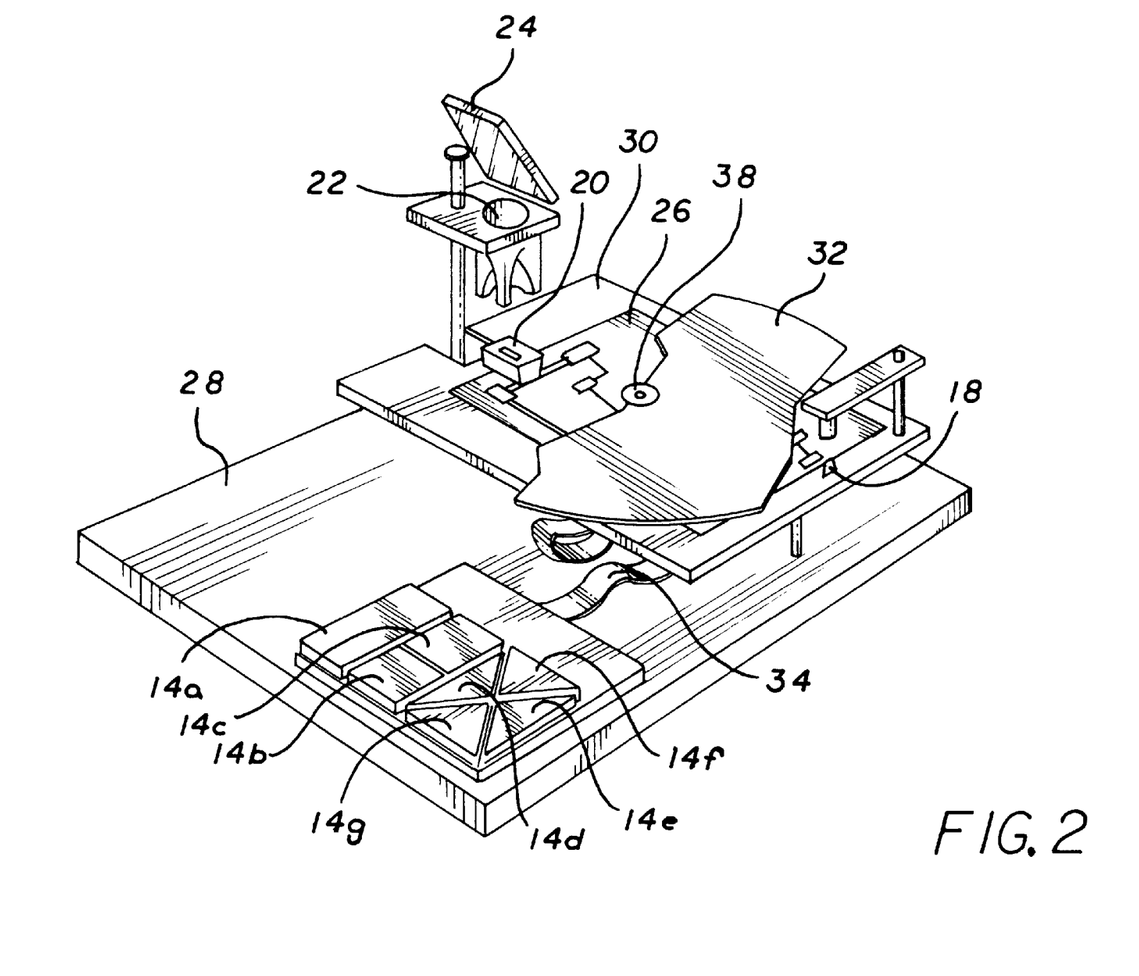
FIG. 2 is a perspective, partial view of the embodiment shown in FIG. 1 with the cover removed.

Referring to FIGS. 1 and 2, FIG. 1 is a perspective view of a preferred embodiment of a high-speed optical image selection system 10 in accordance to the current invention. FIG. 2 shows a perspective, partial view of the high-speed optical image selection system 10 shown in FIG. 1 with the cover 16 removed.

The high-speed optical image selection system 10 includes a base 28 on which operator control buttons 14a–14g and a printed circuit board (PCB) 26 are mounted. The operator control buttons 14a–14g are connected to the PCB 26 by a cable 34. The operator control buttons 14a–14g are adapted to receive operator or user input that is entered to control and select images to be projected.

Figure 3:
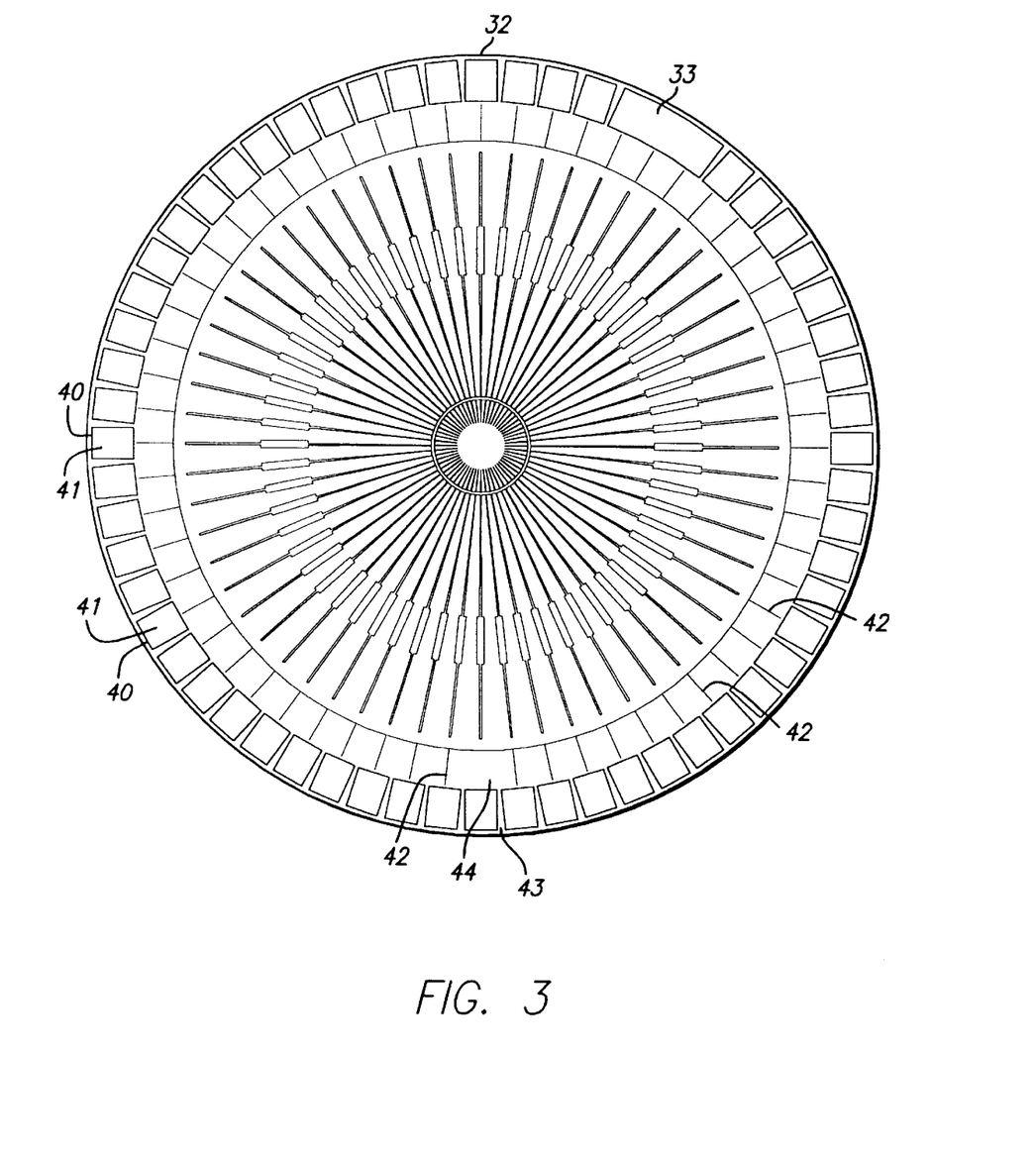
FIG. 3 is a top plan view of an embodiment of an image storage member.
Figure 4:
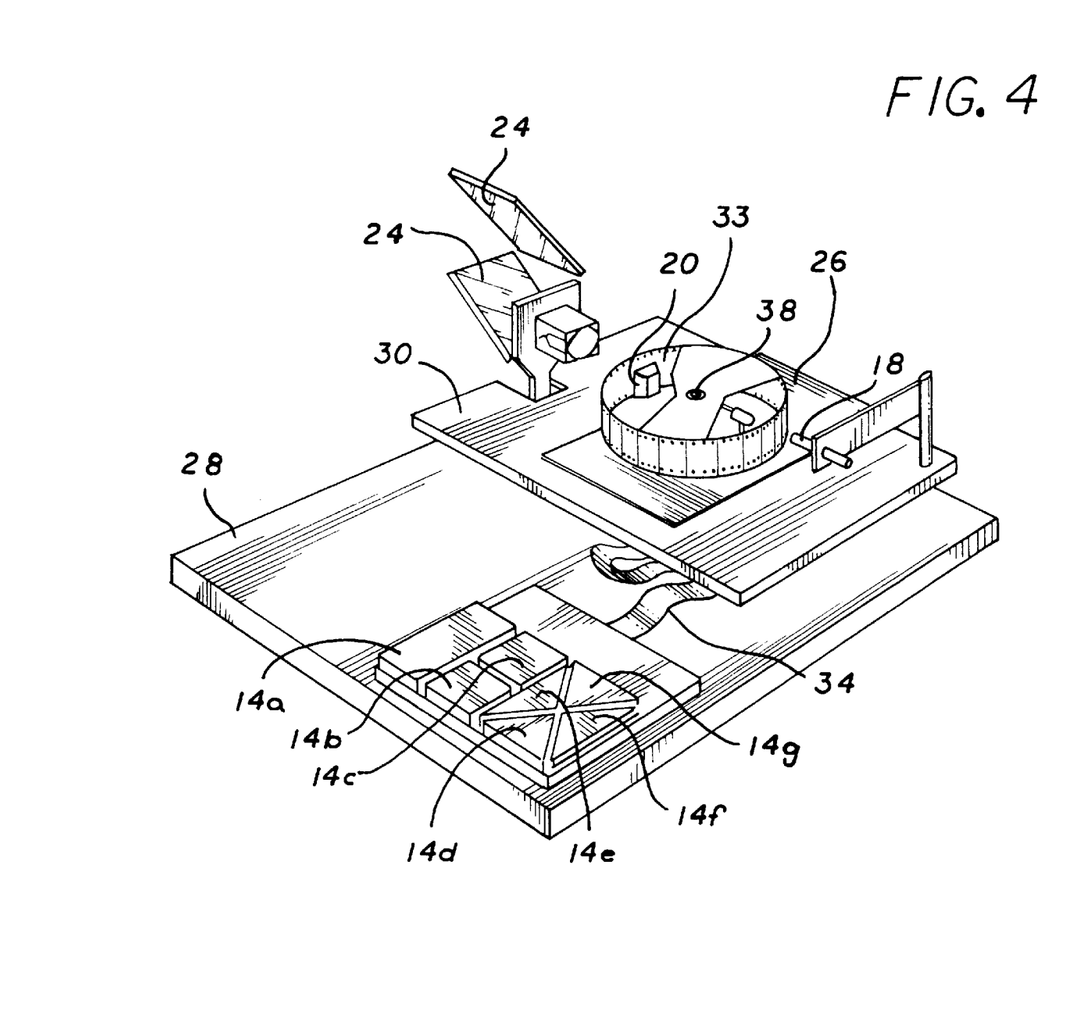
FIG. 4 is a perspective view of another exemplary high-speed optical image selection system.

The high-speed optical image selection system 10 further includes an image storage member 32. As shown in FIG. 3, the image storage member 32 is preferably a film disk that contains a plurality of image frames 40. Each image frame 40 is a square with sides which may be approximately ⅛ inch in length, and contains an image 41 that has a preferred resolution of 1200 pixels by 600 pixels. The film disk 32 also has a plurality of image position markers 42 and a reference marker location 44, which may be in the form of a missing marker line or a special configuration marker. Each image position marker 42 denotes the position of one image frame 40, and the reference marker location 44 denotes the position of the first image frame or image frame zero 43. The film frames can be positioned on multiple rows on the film disk. In the preferred embodiment, the image storage member 32 is a film disk with a 3-inch diameter, and may hold up to 256 image frames. However, the image storage member 32 can also be a film drum, as shown in FIG. 4.

Returning to FIG. 2, the image storage member 32 is mounted on a high-speed motor 38. The motor 38 spins the image storage member 32 to successively place images 41 stored on the image storage member 32 into an image projection path of a projection system. The projection system preferably includes a light source 20 to project an image 41, a convergence lens 22 to focus the light provided by the light source 20, and a viewing lens 24 to direct the projected image onto a viewing area 12, shown in FIG. 1.

In the preferred embodiment, the motor 38 operates at a speed of approximately 3600 revolutions per minute (rpm) or 60 revolutions per second. Therefore, the motor 38 can place an image 41 into the image projection path approximately 60 times per second. The light source 20 can be fired to display or redisplay the image onto a viewing area each time an image 41 is placed in the image projection path. The rapid rate of image display or redisplay makes the images appear generally flicker-free since the human eye can only detect and assimilate images that are displayed or redisplayed at approximately 50 times per second.

The rapid rate of display or redisplay also facilitates the multiplexing of images where two or more images are superimposed on the image viewing area 12 to make a scene. For example, a scene may have a background image and a foreground image. To project or display the scene, the system 10 first fires the light source 20 when the background image is properly placed into the image projection path to project or display the background image. Following the projection or display of the background image, the system 10 fires the light source 20 when the foreground image is in the image projection path to project or display the foreground image. Due to the rapid rate of image projection or display, a typical user would see a generally flicker-free scene with background and foreground images being superimposed on each other.

The rapid display or redisplay of images further enables a panning technique which is to display a panoramic view. To display a panoramic view as represented by panoramic frame 33 in FIG. 3, the light source 20 is repeatedly fired. Every time the light source is fired, a different portion of a panoramic frame is projected. The panoramic frame 33 is proportionately wider than a typical image stored on the image storage member 32. For example, a typical image contains a 60-degree view. Accordingly, the 180-degree panoramic frame 33 occupies the space of three typical images. The light source 20 is then fired three times to project the 180-degree panoramic frame. Every time the light source is fired, one-third of the 180-degree panoramic frame is projected or displayed.

Figure 5:
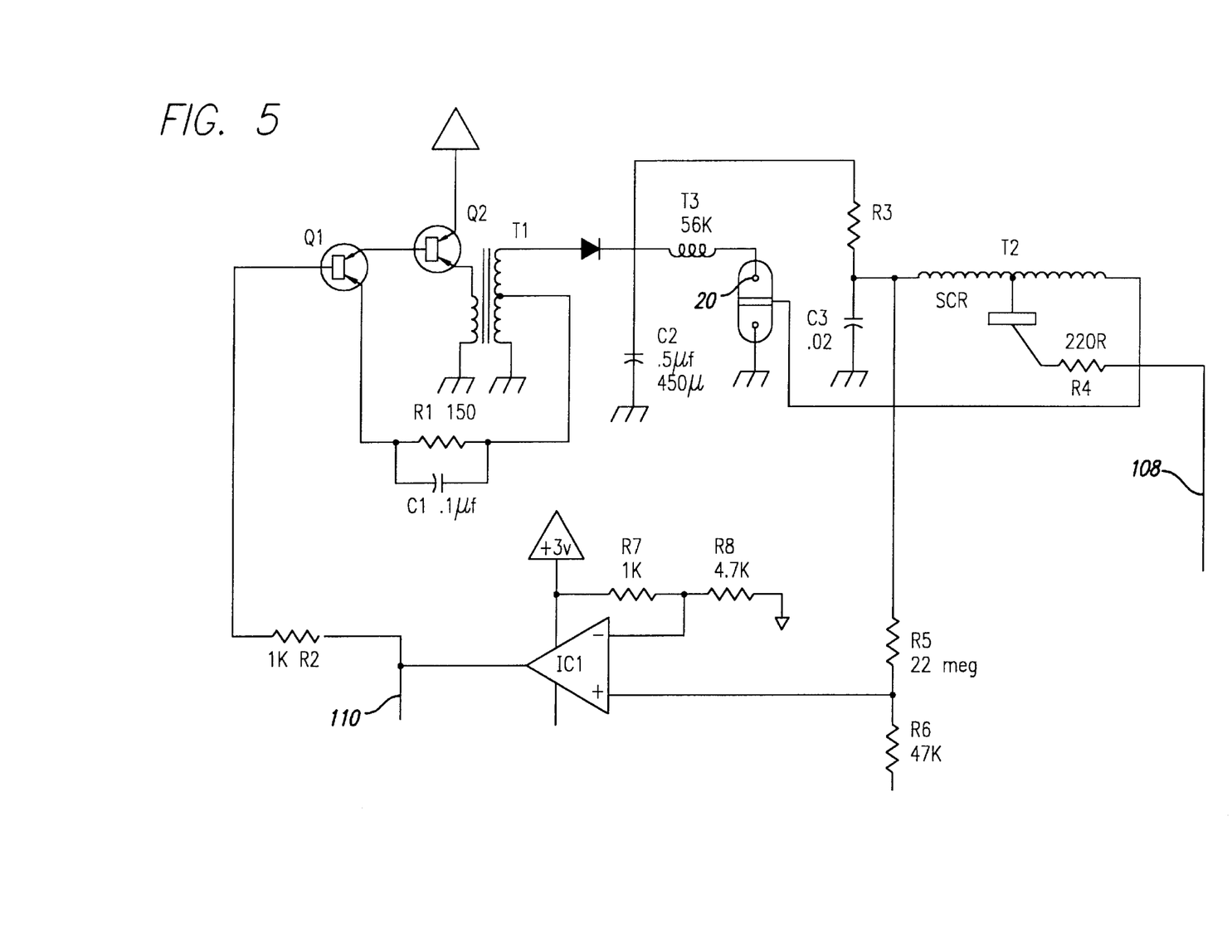
FIGS. 5 and 6 are an electronic circuit diagram of the system.
Figure 6:
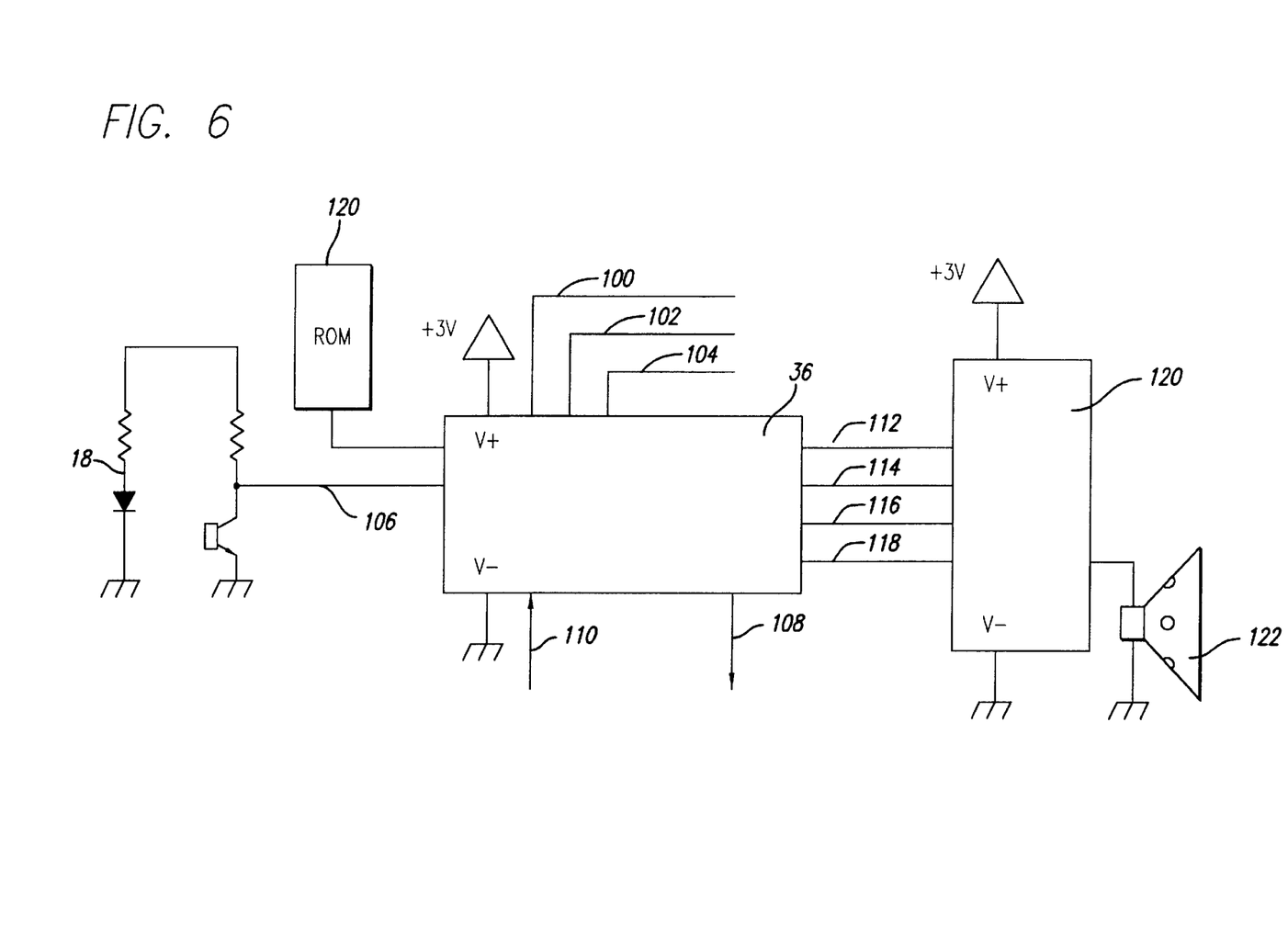

FIGS. 5 and 6 illustrate the electronic circuit of the preferred high-speed optical image selection system 10 shown in FIG. 2. The circuit includes a microprocessor 36 to receive and interpret operator input that the user or operator enters through the operator control buttons 14a–14g. From interpreting the operator input, the microprocessor 36 selects images on the image storage member 32 for display or projection. In the preferred embodiment, the microprocessor 36 may be either a 4-bit Holtek HT44R70 processor or an 8-bit MicroChip 16C505 RISC processor.

The system 10 also has an image position sensing circuit 18 to monitor positions of images. In the preferred embodiment, the image position sensing circuit 18 is an opto-interruptor which monitors position of images by scanning the reference marker location 44 and the image position markers 42. In practice, positions of images can be monitored by scanning and counting the image frames 40.

The system 10 further includes at least one light source 20 for projecting images onto the image viewing area 12, shown in FIG. 1. The preferred embodiment shown in FIG. 2 includes one light source 20. The light source 20 should be pulsed at a short duration of generally less than 10 microseconds ($\mu s$). More specifically, it is desirable that the image does not move more than a few percent of its extent during the strobe interval; and accordingly an even more rapid strobe interval of 1 to 3 microseconds is preferred. The light source 20 is preferably a Xenon gas strobe lamp which can be fired at approximately 450 volts. The strobe lamp 20 provides a good light source since it produces a bright white light with a short burst. However, other low cost light sources may be used. For example, light emitting diodes (LEDs) are another potential light source. A white light, although not as bright as a Xenon gas strobe lamp, can be accomplished by combining red, blue, and green LEDs. As another example, a shuttered incandescent lamp may also be used.

As stated above, in the embodiment that uses a film disk, film frames can be stored on multiple rows on the film disk.

Each of the opto-interruptor and light source can be mounted on a worm gear that is connected to a connection gear. A drive motor can be connected to the connection gear and facilitates the movement of the opto-interruptor and the light source. Accordingly, the opto-interruptor can be moved to a position where it could scan the reference marker location 44 and image position markers 42 to monitor positions of images stored on inner rows that are closer to the center of the film disk. Also, the light source 20 can be moved to positions where it could project images stored on the inner film frames rows. The images should be strategically organized and stored to minimize the movement of the opto-interruptor and the light source, so that the opto-interruptor and the light source can be positioned in sufficient time to maintain the rapid rate of image display or projection. For example, the system may implements an action game with multiple skill levels. Images related to each skill level should be stored on a different row so that the opto-interruptor and the light source are only required to be moved once per skill level. Alternatively, separate light sources and merging image transmission channels may be used to read images from different rows.

Returning to FIGS. 5 and 6, the strobe lamp 20 is fired with a voltage level of approximately 450 volts, as stated above. The voltage level that is used to fire the lamp should be consistent to insure a consistent level of brightness. If the level of brightness is not consistent, the projected images flickers. Accordingly, the lamp firing voltage level should be regulated. Capacitor C2 is used to regulate the lamp firing voltage level.

Transistor Q2 is turned on and off as the transformer T1 transfers power from the primary winding to the secondary winding to charge capacitor C2, which is used to fire the lamp. Since the lamp may be fired at a rate of approximately 60 times per second, capacitor C2 must be charged quickly within a few milliseconds. To provide sufficient power for the charge, transistor Q2 should provide substantial current to the primary winding of transformer T1.

Transistor Q1 is a switch that controls the current flow to transformer T1. When transistor Q1 is turned on, transformer T1 is also turned on. When transistor Q1 is turned off, transformer T1 is also turned off. When transformer T1 is turned on, capacitor C1 releases a charge to increase the current flow. The increase in current flow raises the power output of transformer T1 by approximately 50%. Resistor R1 limits current drawn by transformer T1 so that transformer T1 does not draw excessive current.

Capacitor C3 is used to trigger coil T2 which is in turn used to excite the Xenon gas in the strobe lamp. When transformer T1 charges capacitor C2, it also charges capacitor C3. Resistor R2 is used to reduce the current flow into capacitor C3.

Op-amp IC1 is a comparator that monitors the process of charging capacitors C2 and C3. The voltage across resistors R7 and R8 provides a reference voltage input into op-amp or comparator IC1. When the inventor has charged capacitors C2 and C3 to the desired voltage, op-amp or comparator IC1 outputs a high signal to turn off transistor Q1, thereby turning off transformer T1 to shut down the charging of capacitors C2 and C3. Resistor R5 should have a high value to avoid the bleeding off of small charges. It should be noted that capacitor C2 is charged a few microseconds before capacitor C3. Accordingly, if the voltage level were monitored from capacitor C2, there would be no assurance that capacitor C3 is also completely charged. Therefore, op-amp or comparator IC1 is connected to capacitor C3 to monitor the charging of capacitors C2 and C3.

The output of op-amp or comparator IC1 is fed into the microprocessor 36 through line 110 to inform the microprocessor 36 when capacitor C2 is sufficiently charged and the strobe lamp 20 is thus ready for firing. Operator input through operator control buttons 14a–14g is also fed into the microprocessor 36 through lines 100, 102, and 104. The microprocessor 36 interprets the operator input to select images to be projected or displayed onto the viewing area.

The preferred embodiment shown in FIG. 2 has seven operator control buttons 14a–14g. Each operator control switch is designated for a different function. For example, button 14a may be the fire button, button 14b may be the restart button, button 14c may be the open-door button, and buttons 14d, 14e, 14f, and 14g may be used respectively for up, down, left, and right movements. It should be noted that the functions of these buttons may differ depending on the application of the system.

As stated above, the microprocessor 36 is connected to an image position sensing circuit 18 to monitor positions of images 41. In the preferred embodiment, the image position sensing circuit 18 is an opto-interruptor. As the image storage member 32 spins, it passes through the opto-interruptor 18. The opto-interruptor scans the film disk for the reference marker location 44 and image position markers 42, and generates image position pulses which are fed into the microprocessor through line 106. From these pulses, the microprocessor 36 can determine when a selected image is properly placed into the image projection path.

When capacitor C2 is sufficiently charged and a selected image is in the image projection path, the microprocessor 36 sends a high pulse to the SCR (silicon-controlled-rectifier) through line 108 to fire the strobe lamp 20. The pulse applies sufficient current to the gate of the SCR to cause the SCR to conduct. As a result coil T2 is triggered. Coil T2 excites the Xenon gas in the strobe lamp, thereby causing the strobe lamp to fire. Coil T3 limits the burst duration of the strobe lamp by causing the strobe lamp to extinguish quickly. After the strobe lamp is fired, the SCR resets. The process of charging capacitor C2 is again started.

The strobe lamp is active for generally less than 10 $\mu$s every time it is fired. As stated above, the strobe lamp may be fired approximately 60 times a second. Transformer T1 should be turned off when the strobe lamp is active. As a result, transformer T1 consumes no power when the strobe lamp is active. Thus, power is conserved. In one embodiment, the system 10 is preferably powered using four "AA" batteries. Therefore, power conservation during lamp activation is significant in prolonging the life of the batteries.

The microprocessor 36 is coupled to an audio chip 120 which is connected to a speaker 122. The audio chip 122 contains pre-defined sounds. The microprocessor 36 emits signals to the audio chip through lines 112–118 to select a pre-defined sound. The audio chip 120 then outputs the selected pre-defined sound to the speaker 122. In the preferred embodiment, the audio chip 120 may be a 4-bit Holtek HT83480 chip that can hold up to sixteen different pre-defined sounds.

Figure 7:
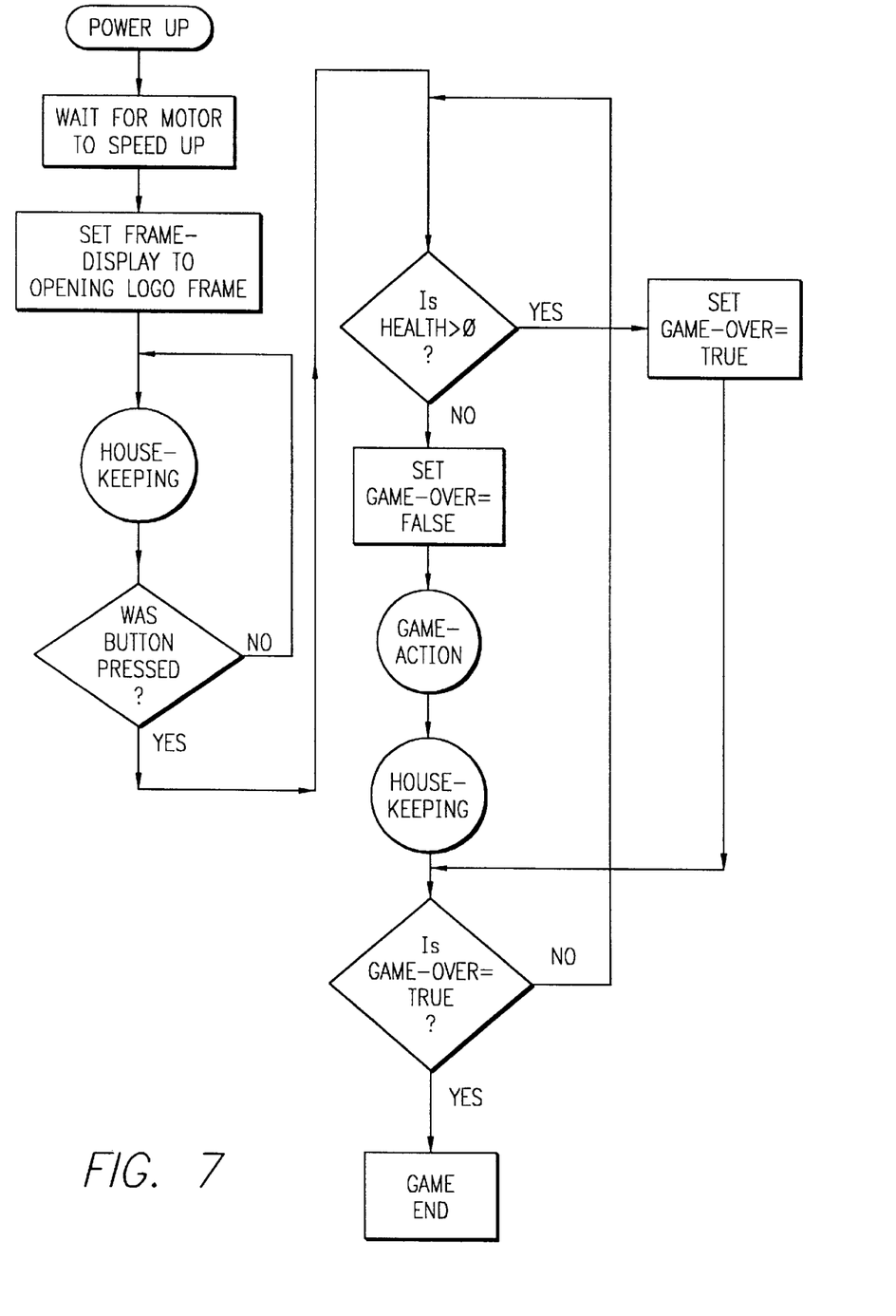
FIGS. 7, 8, and 9 are flow charts showing a software program that is used in one exemplary high-speed optical image selection system.
Figure 8:
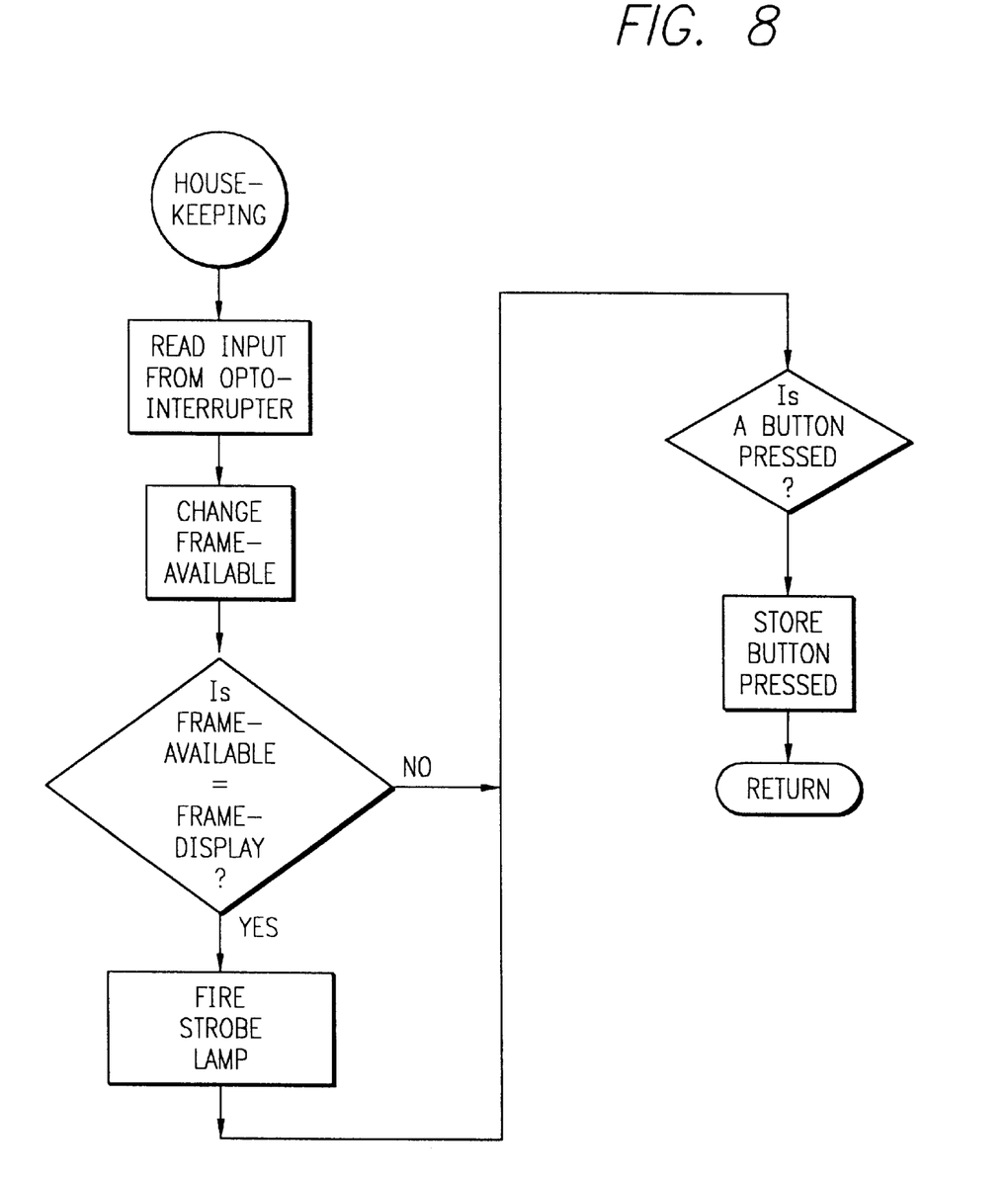
Figure 9:
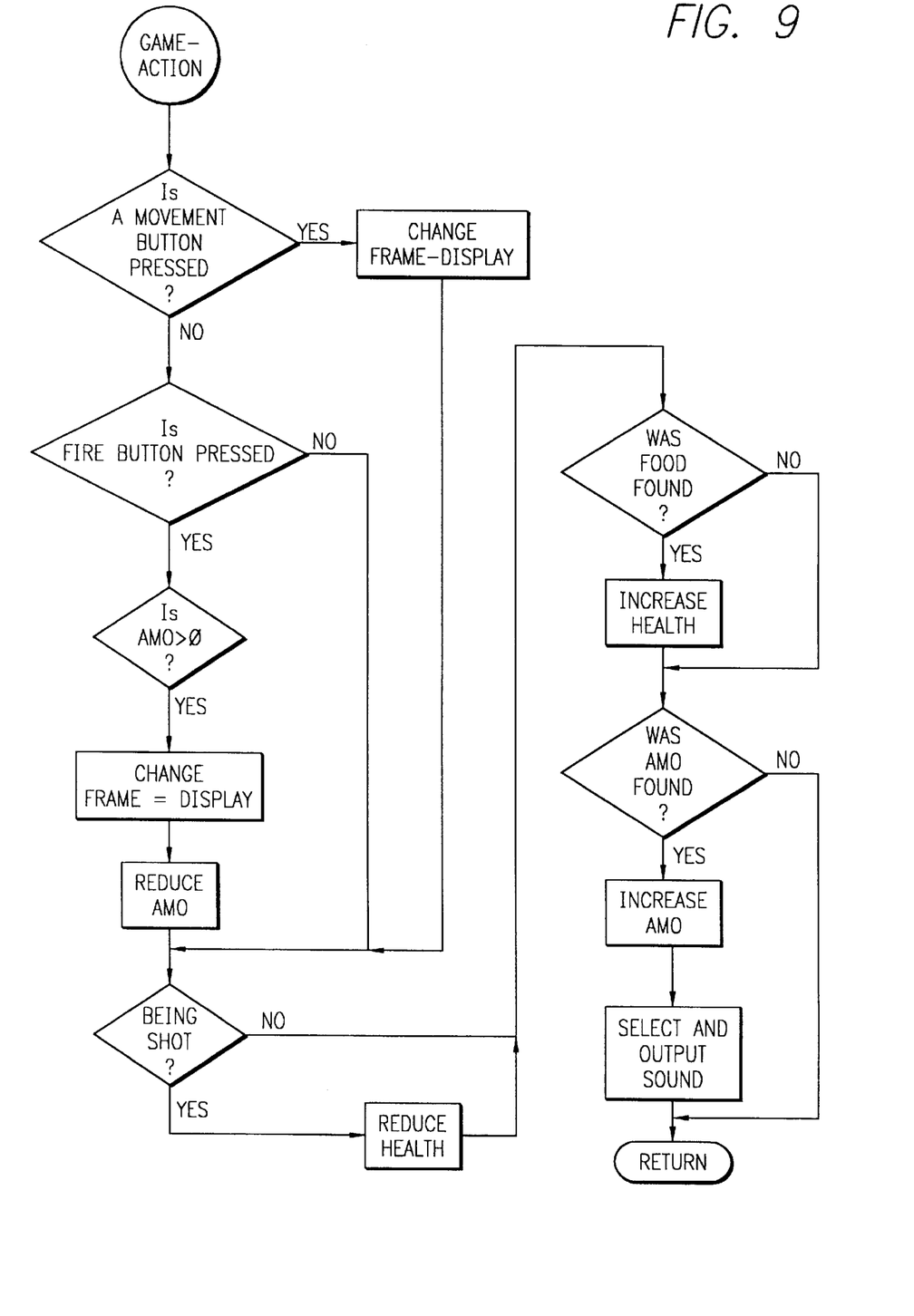

FIGS. 7, 8, and 9 are flowcharts showing a software program that the microprocessor executes in one exemplary embodiment where the system 10 implements an action game that may include a hero or heroine who moves to different positions to seek out available food and ammunition, and aliens and alien space ship that the hero or heroine has to destroy. FIG. 7 shows the programming steps of the main procedure. When the system 10 is turned on, the microprocessor 36 waits for the motor to spin at its top speed. Then the value of the variable FRAME-DISPLAY, which represents the position of the image frame that is to be displayed, is set to be the position of image frame that opening logo image. Sub-routine HOUSE-KEEPING is called to project or display the opening logo image and to monitor input from the operator control buttons.

As soon as the user presses a key, a loop is entered to begin the game. While in the loop, sub-routine GAME-ACTION is called to update the current state of the game. Furthermore, sub-routine HOUSE-KEEPING is called to update the projected or displayed image and to monitor input from the operator control buttons. When the health points of the hero or heroine is reduced to zero, the game is marked as being over, the loop is exited, and the game is ended.

FIG. 8 illustrates the programming steps of sub-routine GAME-ACTION. As stated above, sub-routine GAME-ACTION updates the current state of the game. In sub-routine GAME-ACTION, operator input entered from operator control buttons is interpreted. When a movement button 14d, 14e, 14f, or 14g is pressed, a corresponding image is selected and marked for projection or display. If the fire button 14a is pressed and the hero or heroine in the action game still has ammunition available, a shooting image is selected and marked for projection or display, and the ammunition count is appropriately reduced. When the hero or heroine encounters an enemy and gets shot, the hero or heroine's health points is deducted. As stated above, when the health points of the hero or heroine is reduced to zero, the game is over. When the hero or heroine picks up food or ammunition, health points or ammunition count is increased.

In sub-routine GAME-ACTION, a pre-defined sound corresponding to the action of the hero or heroine is selected and outputted. As stated above, the microprocessor 36 is connected to an audio chip 120 that holds a set of pre-defined sounds. Examples of pre-defined sounds may include hero or heroine getting hit, hero or heroine shooting, alien shooting, alien dying, hero or heroine picking up food or ammunition supplies.

FIG. 9 shows the programming steps of sub-routine HOUSE-KEEPING. As stated above, sub-routine HOUSE-KEEPING is called to monitor positions of images, to fire the lamp to project or display images, and to monitor input entered through the operator control buttons. In sub-routine HOUSE-KEEPING, input from the image position sensing circuit 18, shown in FIGS. 2, 4, and 6 is first read since monitoring image position has the highest priority. Once input is read in from the circuit 18, the position of the image that is currently in the projection path is retained. If the image in the projection path is a selected image, the microprocessor 36 outputs an electronic signal to fire the strobe lamp 20. Then, input from the operator control buttons 14a–14g is read and saved. Sub-routine HOUSE-KEEPING is then exited.

It should be noted that programming a microprocessor or other programmable controller to implement the system described above is within the skill of the ordinary software engineer. Furthermore, eliminating any of the features described above for use in applications where such features are not necessary, is also within the skill of the ordinary software engineer, and any such simplified embodiments are within the scope of the present invention.

Figures 10, 11:
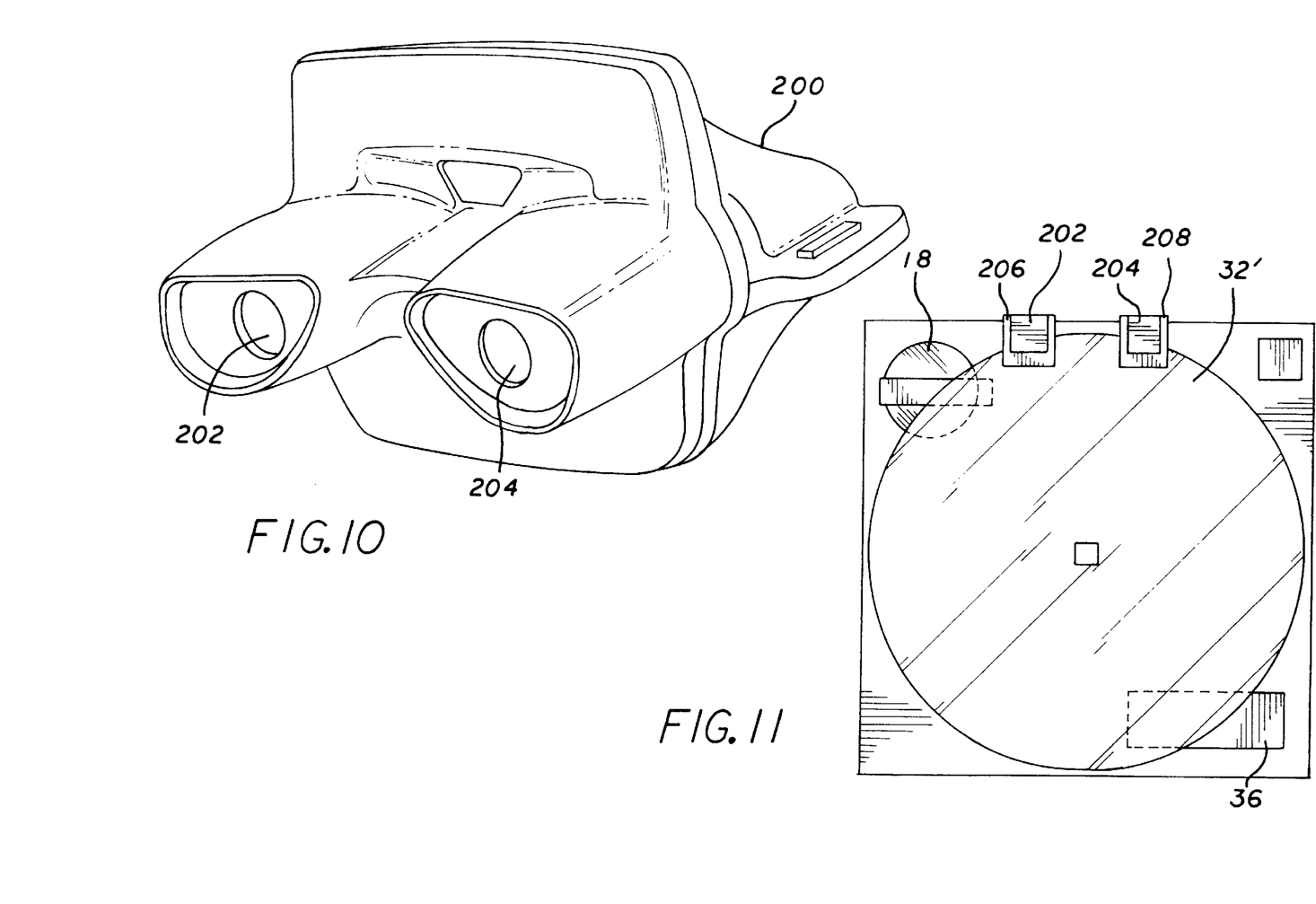
FIG. 10 is a perspective view of an exemplary binocular three-dimensional high-speed optical image selection system.
FIG. 11 is a partial schematic view of the system shown in FIG. 10.

FIGS. 10 and 11 illustrate an exemplary three-dimensional high-speed optical image selection system 200. The system 200 includes two light sources 206 and 208 that are used to project images onto two image viewing areas 202 and 204 to create a three-dimensional visual display. In this system, paired images, differing as is known in the optical field to provide a three-dimensional effect, are located around the film disk 32', spaced apart by the distance between image viewing areas 202 and 204.

Although the present invention has been described in terms of preferred embodiments, numerous modifications and/or additions to the above-described preferred embodiments would be readily apparent to one skilled in the art. Thus, as an example, and not a limitation, a film disk has a preferred diameter of 3 inches. In practice, the film disk's diameter is limited by the physical dimensions of the system, and larger or smaller film disks or cylinders may be used. As another example, each image has a preferred resolution of 1200 pixels by 600 pixels. However, each image may have a resolution that is higher or lower than the preferred resolution. As an additional example, a 4-bit Holtek HT44R70 processor or an 8-bit MicroChip 16C505 RISC processor is used in the preferred embodiment; however, any microprocessor providing similar functionalities may generally be used. As a further example, the preferred embodiment employs a 4-bit Holtek HT83480 sound chip capable of holding up to sixteen different pre-defined sounds. If more than sixteen pre-defined sounds are required, a sound chip with higher capacity may be employed. On the other hand, if less than sixteen pre-defined sounds are required, a lower capacity and lower cost sound chip may be used. Furthermore, the preferred embodiment utilizes a 3600-rpm motor to spin the image storage member. However, any motor that can complete one rotation of the image storage member in generally less than 1/50 of a second may be used. In addition, the preferred embodiment has a reference marker location denoting the first frame or frame zero and image position markers denoting positions of images. However, a different position coding or marking scheme may be used in practice. Accordingly, the present invention is not limited to the specific embodiments illustrated and described hereinabove.

What is claimed is:

1. A high-speed optical image selection system comprising:

at least one image viewing area;

at least one image projection path to direct images onto said image viewing area;

an image storage member having a plurality of images, a reference marker location, and a plurality of image position markers;

a motor coupled to said image storage member to rotate said image storage member at a high speed to complete one rotation in less than 1/50 of a second to move said images successively into said image projection path;

at least one light source to project said images from said image storage member onto said image viewing area;

operator control buttons to control and select images;

electronic circuitry including a light control circuit to actuate said light source, and image position sensing circuit to scan said reference marker location and said plurality of image position markers and generate corresponding image position pulses;

a microprocessor connected to said operator control buttons, said light control circuit, and said image position sensing circuit; and said microprocessor executing a software program (1) to receive and interpret said operator input to select images to be projected, (2) to receive and interpret said image position pulses to determine when selected images are in said image projection path, and (3) to send electrical signals to said light control circuit to actuate said light source when said selected images are in said image projection path to project said selected images from said image storage member onto said image viewing area.

2. A system as defined in claim 1, wherein said light source has an active light emitting interval which is generally less than 10 microseconds in duration.

3. A system as defined in claim 1, further comprising:
at least one convergence lens to focus light provided by said light source; and
at least one viewing lens to direct images onto said image viewing area.

4. A system as defined in claim 1, wherein said system comprises:
a first image viewing area;
a first image projection path to direct images onto said first image viewing area;
a second image viewing area; and
a second image projection path to direct images onto said second image viewing area.

5. A system as defined in claim 1, wherein:
said images have square frames with sides that are approximately 1/8 of an inch in length; and
said image storage member is a film disk that has a diameter of approximately 3 inches and is capable of holding more than 200 of said images.

6. A system as defined in claim 1, wherein said light source is a white light source that comprises red, green, and blue light-emitting diodes (LEDs).

7. A high-speed optical moving image selection system comprising:
at least one image viewing zone;
at least one image projection path to direct images onto said image viewing zone;
an image storage member having a plurality of images thereon;
a motor coupled to said image storage member to rotate said image storage member at a high speed to complete one rotation in less than 1/50 of a second to move said images into said image projection path;
operator control buttons to control and select images;
at least one strobe lamp to project images selected from said rotating member, which are within said projection path, into said image viewing zone; and
electronic circuitry to monitor positions of selected images and to actuate said strobe lamp when said selected images are in said image projection path to project said selected images into said image viewing zone.

8. A system as defined in claim 7 wherein said strobe lamp has an active light emitting interval which is generally less than 10 microseconds in duration.

9. A system as defined in claim 7 wherein said strobe lamp is a Xenon gas lamp that can be fired using an electrical burst of approximately 450 volts.

10. A system as defined in claim 7, further comprising:
at least one convergence lens to focus light provided by said strobe lamp; and
at least one viewing lens to direct projected images into said image viewing zone.

11. A system as defined in claim 7, wherein said system comprises:

a first image viewing zone;
a first strobe lamp to project images selected from said rotating member into said first image viewing zone;
a first image projection path to direct images into said first image viewing zone;
a second image viewing zone;
a second strobe lamp to project images selected from said rotating member into said second image viewing zone; and
a second image projection path to direct images into said second image viewing zone.

12. A system as defined in claim 7, wherein:
said images have square frames with sides that are approximately 1/8 of an inch in length; and
said image storage member is a film disk that has a diameter of approximately 3 inches and is capable of holding more than 200 of said images.

13. A system as defined in claim 7, wherein said image storage member is a film drum.

14. A system as defined in claim 7, wherein said electronic circuitry includes a microprocessor that executes software stored in a read-only memory (ROM) to monitor positions of said selected images and to actuate said strobe lamp to project said selected images onto said image viewing zone.

15. A system as defined in claim 7, wherein said image position sensing circuit includes an opto-interruptor for scanning reference frame marker and image position markers to monitor positions of said selected images.

16. A method for generating action images, comprising the steps of:
forming images on an image storage member;
rotating said image storage member at high speed to complete one rotation in less than 1/50 of a second to move said images into at least one image projection path;
receiving operator input from operator control buttons to control and select images from said image storage member;
monitoring positions of selected images to determine when said selected images are in said image projection path; and
actuating at least one strobe light source when said selected images are in said image projection path to project said selected images from said image storage member onto at least one image viewing area.

17. A method for generating action images as claimed in claim 16, further comprising the step of multiplexing two images to produce a scene having a background image and a foreground image by first projecting said background image and then projecting said foreground image onto said image viewing area.

18. A method for generating action images as claimed in claim 16, further comprising the step of emitting light from said strobe light source for a duration of generally less than 10 microseconds.

19. A method for generating action images as claimed in claim 16, further comprising the step of forming a reference frame marker and a plurality of image position markers on said image storage member.

20. A method for generating action images as claimed in claim 19, further comprising the step of scanning said reference frame marker and said image position markers on said image storage member to monitor positions of said selected images.

* * * * *